United States Patent
Pham et al.

(10) Patent No.: US 11,687,288 B2
(45) Date of Patent: Jun. 27, 2023

(54) METHOD OF QUEUE DESIGN FOR DATA STORAGE AND MANAGEMENT

(71) Applicant: VIETTEL GROUP, Ha Noi (VN)

(72) Inventors: Thanh Phong Pham, Yen Mo District (VN); The Anh Do, Ha Noi (VN); Thi Huyen Dang, Ha Noi (VN); Viet Anh Nguyen, Thanh Hoa (VN)

(73) Assignee: VIETTEL GROUP, Ha Noi (VN)

( * ) Notice: Subject to any disclaimer, the term of this patent is extended or adjusted under 35 U.S.C. 154(b) by 74 days.

(21) Appl. No.: 17/510,781

(22) Filed: Oct. 26, 2021

(65) Prior Publication Data
US 2022/0129203 A1    Apr. 28, 2022

(30) Foreign Application Priority Data
Oct. 27, 2020    (VN) .............................. 1-2020-06184

(51) Int. Cl.
*G06F 3/06*    (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 3/061; G06F 16/27
See application file for complete search history.

(56) References Cited

U.S. PATENT DOCUMENTS

2018/0307571 A1 * 10/2018 Bishop ................ G06F 11/1438
2019/0347590 A1 * 11/2019 Rajasekaran ...... G06Q 10/0635

FOREIGN PATENT DOCUMENTS

CN    109934361 B  *  3/2022
RU        2723296 C1  *  6/2020

* cited by examiner

*Primary Examiner* — Charles Rones
*Assistant Examiner* — Alexander Vinnitsky
(74) *Attorney, Agent, or Firm* — Patenttm.US

(57) ABSTRACT

A method of queue design for data storage and management applies RAM data synchronization technology on many distributed nodes, both ensures storage performance and solves the problem of data loss in the system operation process; performs business separation and parallelize actions to optimize processing performance; uses simply extracted information instead of accessing the original information helps to speed up the processing ability and promptly detect events that exceed the threshold; allocates a fixed memory for the queue to ensure the safety of the whole system; in addition, provides monitoring and early warning of possible incidents. The method includes: step 1: build a deployment model; step 2: initialize the values when the application first launches; step 3: process write data to the queue; step 4: detect the threshold and process the data in the queue; step 5: remove processed data from the queue; step 6: monitor queue and early warn.

4 Claims, 5 Drawing Sheets

MaxStorage = 100
VolumeLimit = 10
TimeLimit = 300s
Interval = 1s
PreviousTime = 02/09/2020 15:00:00
Current Time = 02/09/2020 15:00:10

Queue

| 0 | 1 | ... | 9 |  |
|---|---|---|---|---|
| Data0 | Data1 | ... | Data9 |  |

Index Management Table

| first index | 0 |
|---|---|
| last index | 10 |

MaxStorage = 100
VolumeLimit = 10
TimeLimit = 300s
Interval = 1s
PreviousTime = 02/09/2020 15:00:10
Current Time = 02/09/2020 15:00:10

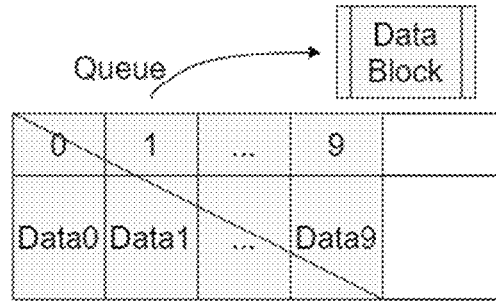

Index Management Index

| first index | 10 |
|---|---|
| last index | 10 |

Figure 5

MaxStorage = 100
VolumeLimit = 10
TimeLimit = 300s
Interval = 1s
PreviousTime = 02/09/2020 15:00:10
Current Time = 02/09/2020 15:05:10

Queue

| 10 | 11 | 12 | 13 |
|---|---|---|---|
| Data 10 | Data 11 | Data 12 | Data 13 |

Index Management Table

| first index | 10 |
|---|---|
| last index | 14 |

MaxStorage = 100
VolumeLimit = 10
TimeLimit = 300s
Interval = 1s
PreviousTime = 02/09/2020 15:05:10
Current Time = 02/09/2020 15:05:10

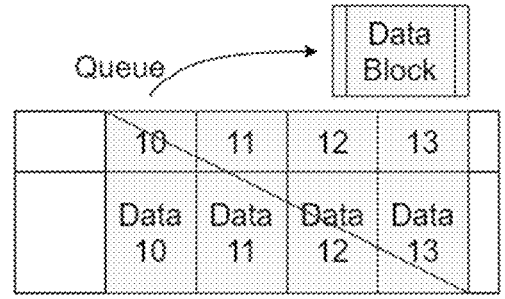

Index Management Table

| first index | 14 |
|---|---|
| last index | 14 |

Figure 6

METHOD OF QUEUE DESIGN FOR DATA STORAGE AND MANAGEMENT

The disclosure relates to a method of queue design for data storage and management. In particular, this method is applicable to most systems that require the processing of large and high-speed queues efficiently in order to speed up data retrieval and processing, improve performance and ensure safety for real systems.

TECHNICAL STATUS OF INVENTION

In the process of developing systems related to data transmission, developers often have problems with queue design, how to build a queue that achieves high processing speed and also minimize data loss in unexpected cases. For example, for systems involved in mobile data charging, bank billing, and especially systems serving a large number of users, the design of a queue system not only ensures data safety or processing speed, but also is important to ensure the safety of the system itself (involving queue overflow, resource contention between processes within the system or different systems). Nowadays, there are different methods and technologies for designing a queue such as sequential processing method, parallel processing method, data storage technology on RAM, disc or synchronously storing data on RAM between distributed nodes.

However, the application of unreasonable methods and technologies can cause problems. Processing the queue sequentially which ensures accurate data processing but slows down the speed; choosing queue technology on RAM inevitably loses data when the system crashes; choosing a hard drive system faces performance issues.

TECHNICAL NATURE OF INVENTION

The purpose of the present invention is to overcome the disadvantages of a conventional queuing system as mentioned above, and to propose a new technology-based method for better data management and system safety. To achieve the above purpose, the proposed method includes three main contents:
  Performing separation of actions in the process of managing and processing data for queues to accelerate speed.
  Applying RAM synchronous storage technology on many distributed nodes to help ensure the processing speed and overcome the problem of data loss when there is a problem.
  Designing the simplest way to store, monitor and retrieve data, set storage limits for queues to avoid affecting the whole system in all cases.

The specific steps to accomplish the purpose as well as the three main contents above are as follows:

Step 1: build deployment models; at this step simultaneously deploy many distributed nodes, install database using RAM synchronization mechanism for these nodes; in all distributed nodes, only one node can do business with the database at a time, the rest have data redundancy function. As a recommendation, it is possible to build two to three nodes in a synchronous pool because the larger the number of nodes, the higher the synchronization cost between the nodes.

Step 2: initialize values when the application first launches; At this step, the values to be initialized include: initialization of the queue table and the index management table, the threshold for the number of elements corresponding to the maximum number of elements in a data block, the corresponding time threshold with the maximum storage time of one data element in the queue, initialize the first index value=0 and the last index=0 and store it in the index management table (these two values are key values identifying for the first and last element that is being stored in the queue but has not yet reached the processing cycle), initiate the queue monitor process, perform monitoring events when the queue reaches one of the limits as above.

Step 3: handle writing data to the queue; at this step, the data is written directly to the database with the key being the last index value obtained from the index management table; then update new value for last index in ascending rule and cycle back to 0 if queue storage limit value is reached.

Step 4: detect when threshold is exceeded and process data in the queue; at this step, the system periodically checks the queue status according to two criteria: the number of items in the queue but not yet processed and the storage time of the elements in the queue. If the number of unprocessed elements exceeds the threshold value of the number of elements or the storage time of the elements exceeds the time threshold value, then read out the elements, aggregate them into a block and forward to the next processing. To speed up the processing speed, checking for over-threshold conditions is done through feature extraction information such as the first index, the last index, without directly retrieving data from the queue table.

Step 5: remove processed data from the queue; at this step, initiate a separate process and remove the elements processed in step 4 from the queue. The delete action is performed independently of other processing actions such as new data logging or monitoring, threshold detection. In addition, the delete action is done slowly and spread over a period of time to help avoid high system load.

Step 6: monitor the queue and early warn; at this step, initiate a separate process and periodically check the number of items stored in the queue, issue an alert when the number of elements that are stuck exceeds 70% of the number of elements the maximum storage of the queue (MaxStorage). This action helps users identify problems that may occur during system operation.

BRIEF DESCRIPTION OF DRAWINGS

FIG. 5 is an illustration of when the queue reaches the threshold value of the number of elements.

FIG. 6 shows when the queue reaches the time threshold.

DETAILED DESCRIPTION OF INVENTION

Before going into the detailed description, we have a convention to understand an element stored in the database of the form: {Key, Data}.

Figure 1:
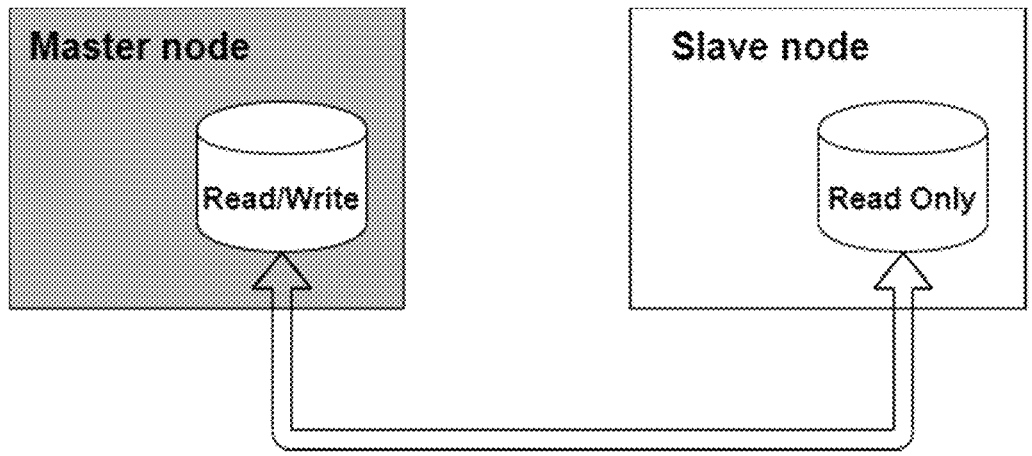
FIG. 1 is an illustration of the application deployment model.
Figure 9:
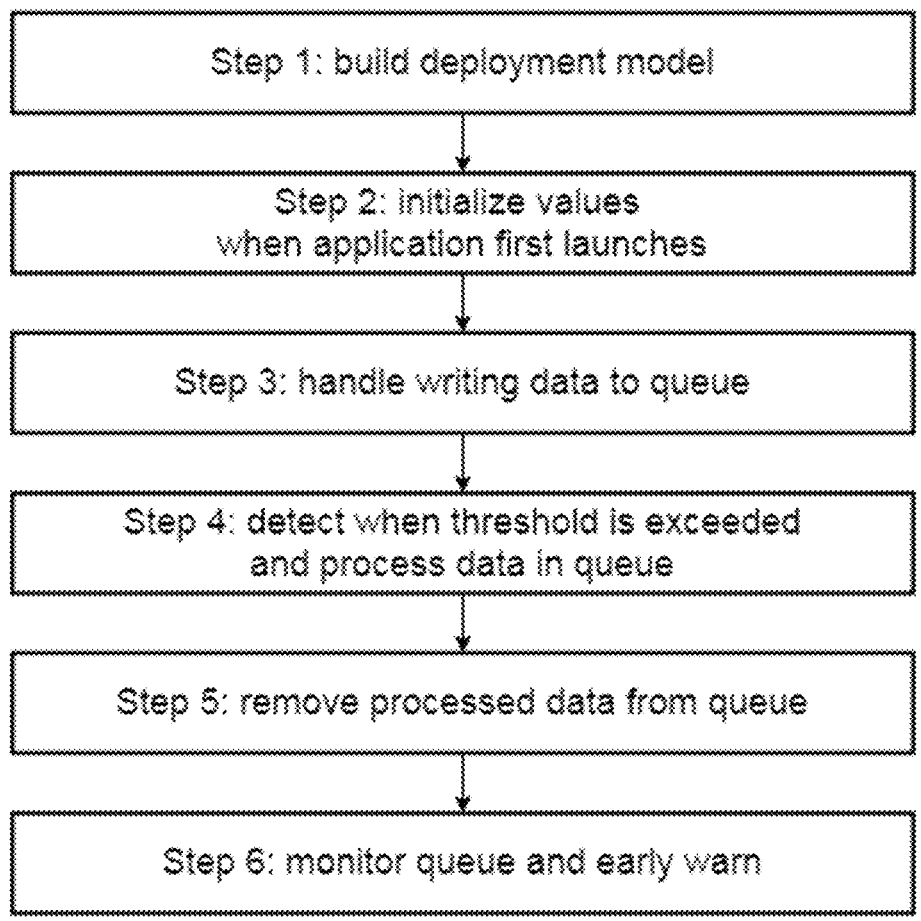
FIG. 9 is an illustration of the invention implementation method.

Referring to FIG. 9, details of the method of constructing queues that support data storage and management are shown as follows:

Step 1: build deployment models; the input to this step (also the input to the method) is the database management system; at this step, implement simultaneous deployment of many distributed nodes, install a database using RAM synchronization for these nodes; in all distributed nodes, only one node can do business with the database, the rest have data redundancy function. It is recommended that two to three nodes be built in a synchronous cluster because the larger the number of nodes, the higher the synchronization cost between the nodes (refer to FIG. 1); at the end of this step obtain the RAM synchronous database on many distributed nodes and the list of nodes in the synchronous cluster.

Step 2: initialize values when the application first launches; the input of this step is the output of step 1, that is, the parameter to configure the list of synchronous nodes, in addition, the input of this step is the amount of storage allocated to the queue, the threshold value of the number of synchronous nodes, the threshold value of the number of elements and the storage time threshold for an element; at this step, initialize the values as follows:

Initialize the queue table and the index management table, where:

If the queue table does not exist yet, create the table with the {ram_copies, synchronous node list} attribute. If the table already exists, perform data updates from other nodes in the synchronous cluster.

If the index management table does not exist, create the table with the attribute {ram_copies, synchronous node list}, then insert the two information {first index, 0} and {last index, 0} into it. If the table already exists, perform data updates from other nodes in the synchronous cluster.

Initialize a storage capacity value for the queue (MaxStorage) corresponding to the maximum number of elements allowed to be stored in the queue table. In case the queue reaches the maximum element, new elements will be overwritten from the beginning of the queue.

Initialize the threshold value of the number of elements (VolumeLimit) corresponding to the maximum number of elements in a data block to be processed. This value depends on the business requirements of each system. As a practical estimate when applicable, the threshold value of the number of elements is calculated by taking the integer value of the [queue storage capacity value]/k, where k is the factor of safety (10<k<storage capacity value for the queue), the larger the k value, the better for parallel processing, limiting duplicate processing or data overwriting. Example: With a queue storage capacity value=1,000,000; the threshold value of the number of elements=50,000.

Initialize a time threshold value (TimeLimit) corresponding to the maximum storage time of a data element in the queue. For example, time threshold value=6 minutes.

Initialize the queue check interval (Interval), this value depends on the transactions per second speed of writing data to the queue (Tps). The higher the data write rate, the smaller the queue check cycle value must be to correctly identify queue overstep events. According to actual evaluation, the queue check cycle value should be the divisor of the time threshold value and range from 0 to [time threshold value]/Tps (seconds). For example, queue test cycle value=100 ms.

Figure 2:
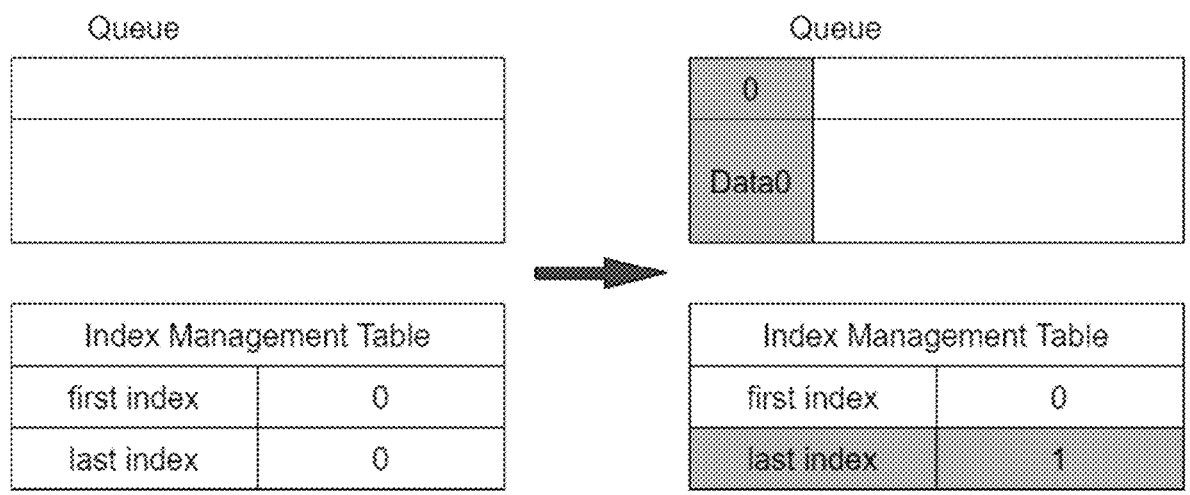
FIG. 2 illustrates the process of initializing and writing the first data to the queue.

Initiate the process to monitor and handle events that exceed the threshold of the queue; setting the test cycle conditions through the queue test cycle value value; initializes the value of the nearest processing time (PreviousTime) to the current time and stores it in the state of the process (refer to FIG. 2).

At the end of this step, we obtain three main components that make up a queue: the index management table, the queue data table, and the monitoring and data processing process for the queue. The other values are the parameters that make up these three components.

Figure 3:
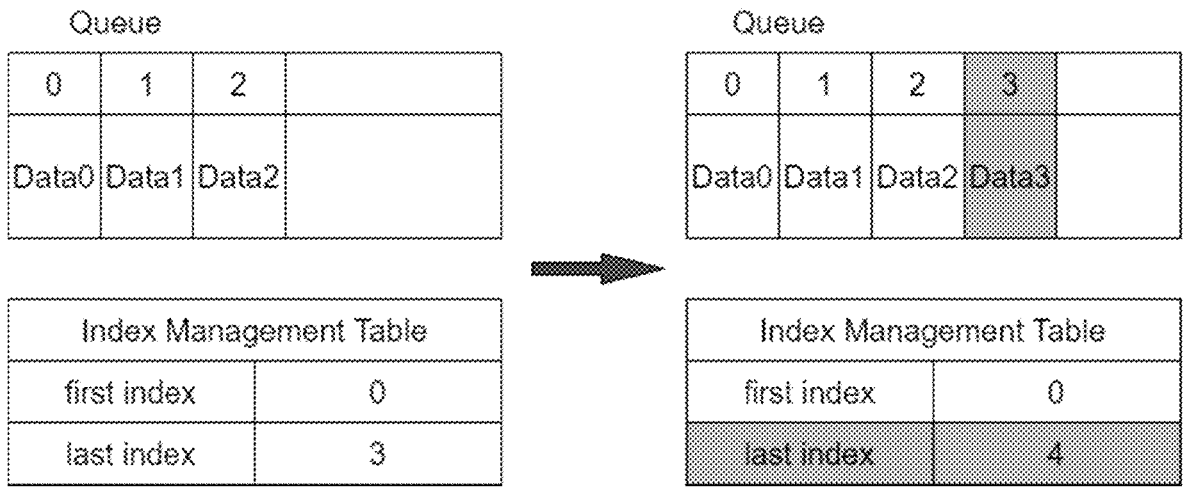
FIG. 3 illustrates the process of writing new data to the queue under normal circumstances.
Figure 4:
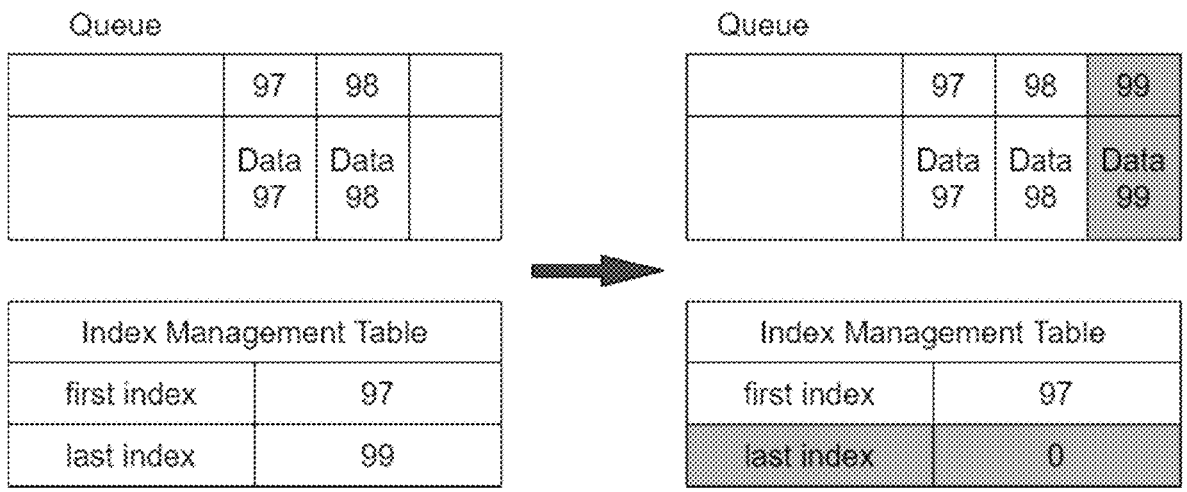
FIG. 4 illustrates the process of writing new data to the queue in case of border reach.

Step 3: handle writing data to the queue; input is data from another business or system sent to the queue; refer to FIG. 3 and FIG. 4, at this step, perform the following sub-steps:

S3.1: when data (Data) is sent, read the last index value (Last) from the index management table. Insert the {last index, Data} element in the queue table.

S3.2: update the new last index value according to the increment and rotation rule between 0 and the storage value for the queue−1. Update the new last index value in the index management table. Then compute the temporary last index value (Last_tmp) as the result of the calculation (last index+1), comparing Last_tmp with the storage value for the queue.

If Last_tmp≥the storage capacity value for the queue, update {last index, 0} to the index management table.
Otherwise, update {last index, last_tmp} to the index management table.

At the end of this step, the output is the queue table containing the data just written.

Step 4: detect when threshold is exceeded and process data in the queue; the input to this step is the data in the queue written in step 3; referring to FIGS. 5 and 6, at this step, perform a periodic check of the threshold conditions at the queue monitoring process in the order of the following sub-steps:

S4.1: perform reading of the first (First) and last (Last) index values in the index management table.

S4.2 calculate the number of unprocessed elements in the queue through the first and last index values.

If last index value≥first index value, the number of elements is calculated by calculation: last index value−first index value.
In contrast, the number of elements is calculated by calculation: storage capacity value for the queue−first index value+last index value.

S4.3: compare the number of elements with the threshold value of the number of elements (VolumeLimit). If the threshold value is exceeded, go to step S4.6. If the threshold is not reached, continue to step S4.4.

S4.4: calculate the difference between the current time and the most recent (PreviousTime) value stored in the state of the process. The time difference is calculated as: current time−last processing time.

S4.5: compare the time difference with the time threshold value (TimeLimit). If time difference<time threshold value, go to step S4.10; if time difference>time threshold value, continue to step S4.6.

S4.6: read elements in the first index and last index value in the queue table.

If last index value=first index value, there are no elements to get.
If last index value>first index value, get the elements with key incrementing from first index value to last index value−1.
If the last index value<the first index value, get the elements with key incrementing from the start index value to the storage value for the queue −1 and from 0 to the last index value−1.

S4.7: collect elements into data blocks and move to the next processing operations, and call to step 5 to delete the elements that have just been read from the queue table.

S4.8: update index value by inserting {first index, last index} into the index management table.

S4.9: update the value of the last processing time=current time and save it in the state of the process.

S4.10: set a timer after queue check cycle value time, execute step callback S4.1.

At the end of this step, a block of data is obtained according to either the number of elements threshold or the time threshold.

Figure 7:
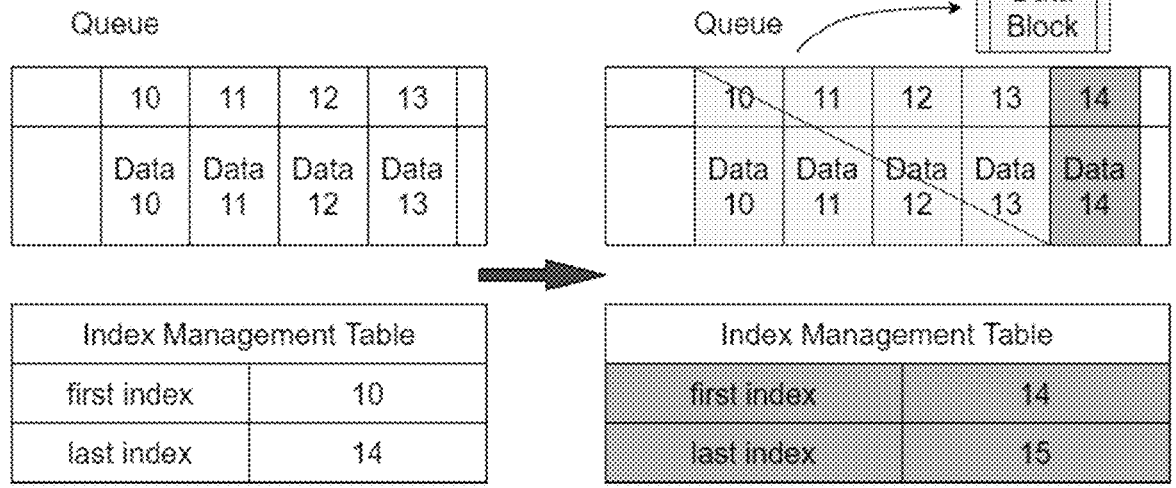
FIG. 7 illustrates the parallel processing of writing new data while clearing the previous session's data.

Step 5: remove processed data from the queue; the input of this step is the first and last index values of the elements just processed in step 4; refer to FIG. 7, at this step, initiate a new process and perform the following actions:

If last index value=first index value, terminate the process.

If last index value>first index value, delete the elements with the key incrementing from the first index value to the last index value−1 from the queue table.

If last index value<first index value, delete elements with keys incrementing from the first index value to the storage value for the queue−1 and from 0 to the last index value−1 from the queue table.

At the end of this step, the queue table has been cleaned up.

Figure 8:
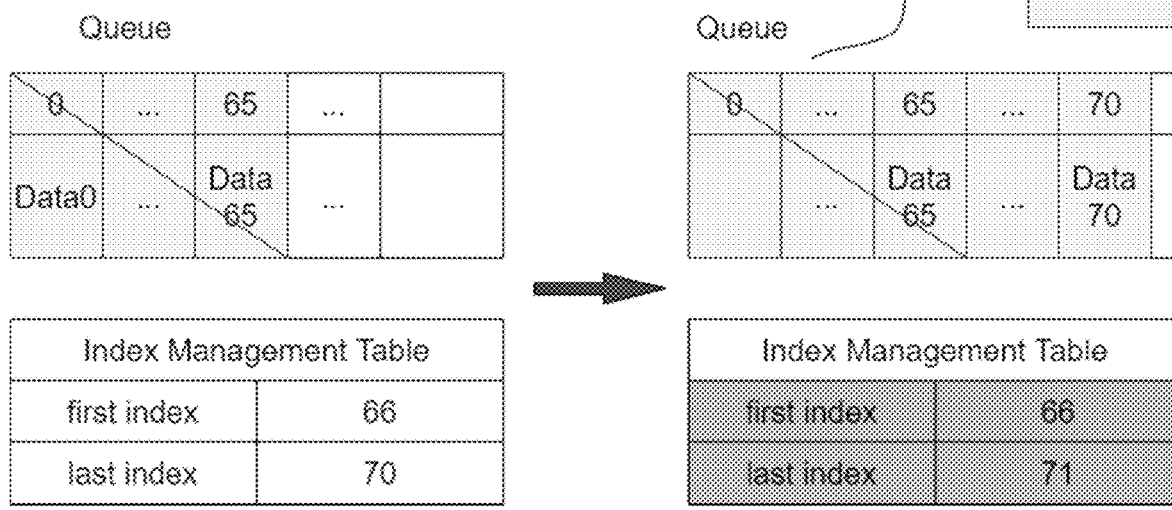
FIG. 8 illustrates the process of risk identification and early warning.

Step 6: monitor the queue and early warn; the input to this step is the queue table information initialized from step 2; refer to FIG. 8, at this step, perform a process initialization that periodically checks the number of elements in the queue, doing:

S6.1: check the number of elements stored in the queue table. If the number of elements in the queue table exceeds 70% of the storage value for the queue, perform logging or broadcast a warning message.

S6.2: set a timer after a period, repeat step S6.1.

The end of this step is a warning if any.

The end result is to build a queue that meets the basic functions of storing data, grouping data according to one of two criteria: exceeding the threshold of number of elements and exceeding the threshold of storage time; especially, the queue is capable of withstanding large loads, storing large data and supporting data redundancy, minimizing the possibility of data loss in the event of a failure; in addition, the allocation of fixed memory for the queue ensures safety for the system and neighboring systems. In short, queuing has solved the outstanding problems in the technical nature section mentioned above.

EXAMPLES OF INVENTION APPLICATION

This method is applied in the CDR record management module of the CDF subsystem, the CDR file management module of the CGF subsystem, and in the high-load system logging module of the PGW subsystem of the EPC system managed by the Military Corporation. Team—Telecommunications industry (Viettel) self-developed.

EFFECT OF INVENTION

This queuing design approach achieves the following effects:

Fully supports the basic functions of a queue, which is to aggregate data into blocks according to events that exceed the number of elements and the retention time threshold.

Ensuring high-load handling, accelerated read-write speeds, and over-threshold event detection.

Good support for systems that require large data queues and especially require high data safety.

Overcoming some of the risks of conventional queues: isolating memory without affecting other businesses and systems, supporting risk monitoring and early warning to system operators.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. Queue design method for a queue data storage and management including the steps of:

step 1: build deployment models; simultaneously deploy a set of many distributed nodes, install a database using a RAM synchronization mechanism for these nodes; in all distributed nodes, wherein only one node can do business with the database at a time, the rest of the nodes have data redundancy function;

step 2: initialize values when the method first launches; an input of this step is an output of step 1, that is, a parameter to configure a list of synchronous nodes, in addition, the input of this step is an amount of storage allocated for the queue, a threshold value of a number of elements and a storage time threshold for an element; At this step, perform initialization of values comprising:

a queue table and an index management table;

a storage value for the queue corresponding to a maximum number of elements allowed to be stored in the queue table; in case the queue reaches an element maximum, new elements will be overwritten from a beginning of the queue;

the threshold value of a number of elements corresponding to a maximum number of elements in a data block to be processed; wherein this value depends on the business requirements of each system; according to the actual evaluation where applicable, the threshold value of the elements is calculated by taking an integer value of the [queue storage capacity value]/k, where k is a factor of safety (10<k<storage capacity value for the queue);

a time threshold value corresponding to a maximum storage time of a data element in the queue;

a queue check cycle value, which depends on a speed at which data is written to the queue;

monitoring and handling events that exceed the threshold of the queue; setting the test cycle conditions through the queue test cycle value value; initialize the last processing time value to the current time and store it in the state of the process;

at the end of this step, obtain three main components constituting a queue: the index management table, the queue table and the monitoring and data processing process for the queue;

step 3: handle writing data to the queue; input is data from another business or system sent to the queue; At this step, perform the following steps:

when data is sent in, read from the last index value from index management table; insert element {last index value, data} into queue table;

update the new last index value according to the increment and cycle rule between 0 and the storage value for the queue−1; update the new last index value to the index management table; then compute the temporary last index value (Last_tmp) as the result of the calculation (last index value+1), comparing Last_tmp with the storage value for the queue;

if Last_tmp≥storage threshold value for the queue, update {last index value, 0} to the index management table;

in contrast, update {last index, Last_tmp} to the index management table;

at the end of this step, the output is the queue table containing the data just written;

step 4: detect when the threshold is exceeded and process data in the queue; the input to this step is the data in the queue written in step 3; at this step, perform periodic checks for over-threshold conditions at the queue monitoring process; at the end of this step, a block of data is obtained according to either the number of elements threshold or the time threshold;

step 5: remove processed data from the queue; the input of this step is the first and last index values of the elements just processed in step 4; at this step, initiate a new process and perform the following actions:

if last index value=first index value, terminate the process;

if last index value>first index value, delete the elements with the key incrementing from the first index value to the last index value−1 from the queue table;

if last index value<first index value, delete elements with keys incrementing from the first index value to the storage value for the queue−1 and from 0 to the last index value−1 from the queue table;

at the end of this step, the queue table has been cleaned up;

step 6: monitor the queue and early warn; the input to this step is the queue table information initialized from step 2, at this step, perform a process initialization that periodically checks the number of elements in the queue, doing:

check the number of elements stored in the queue table, if the number of elements in the queue table exceeds 70% of the storage value for the queue, perform logging or broadcast a warning message;

set a timer after a certain amount of time, repeat the check for the number of elements stored in the queue table;

the end of this step is a warning if any;

the end result is to build a queue that meets the basic functions of storing data, grouping data according to one of two criteria: exceeding the threshold of number of elements and exceeding the threshold of storage time; especially, the queue is capable of withstanding large loads, storing large data and supporting data redundancy, minimizing the possibility of data loss in the event of a failure; in addition, the allocation of fixed memory for the queue ensures safety for the system and neighboring systems.

2. The queue design method according to claim 1, wherein in step one, building two to three nodes in a synchronous pool because the larger the number of nodes, the higher the synchronization cost between the nodes.

3. The queue design method according to claim 1, wherein in step 2, the larger the k value, the better for parallel processing, limiting duplicate processing or data overwriting.

4. The queue design method according to claim 1, wherein in step 2, the higher the data write rate, the smaller the queue check cycle value must be to correctly identify queue overstep events; the queue check cycle value is the divisor of the time threshold value and ranges from 0 to [time threshold value]/Tps (seconds).

\* \* \* \* \*